United States Patent
Tuttle

[15] 3,701,430
[45] Oct. 31, 1972

[54] OIL SKIMMER
[72] Inventor: Ralph L. Tuttle, 7135 Hollywood Boulevard, Hollywood, Calif.
[22] Filed: Feb. 16, 1971
[21] Appl. No.: 115,416

[52] U.S. Cl. ............................210/242, 210/DIG. 21
[51] Int. Cl. ...............................................C02b 9/02
[58] Field of Search.........210/83, 242, DIG. 21; 61/1

[56] References Cited

UNITED STATES PATENTS

| | | | |
|---|---|---|---|
| 3,237,774 | 3/1966 | Shuback | 210/242 |
| 61,880 | 2/1967 | Serrell | 210/242 |
| 3,348,690 | 10/1967 | Cornelissen | 210/DIG. 21 |
| 3,268,081 | 8/1966 | Menkee et al. | 210/242 |
| 3,581,899 | 6/1971 | Hunter | 210/242 |
| 3,590,584 | 7/1971 | Fitzgerald | 61/1 |

FOREIGN PATENTS OR APPLICATIONS

| | | | |
|---|---|---|---|
| 947,026 | 1/1964 | Great Britain | 210/242 |
| 308,940 | 3/1933 | Italy | 210/242 |

*Primary Examiner*—Reuben Friedman
*Assistant Examiner*—T. A. Granger
*Attorney*—Lyon & Lyon

[57] ABSTRACT

A structure to be used in conjunction with a barge for skimming oil spilled on the surface of harbor waters, lakes and the like comprising one or two outriggers which can be partially positioned just below the surface of the oil and which have harvesting booms that converge at the rear joining a collector sump from which the oil and water can be pumped into the barge. The system may also include a means for separating the oil from the water and also for separating out large particles of debris which are frequently found floating in these waters. For use in situations where the body of water has a light-swell condition, the outriggers include flexible leading ends which will follow the contour of the water surface.

7 Claims, 8 Drawing Figures

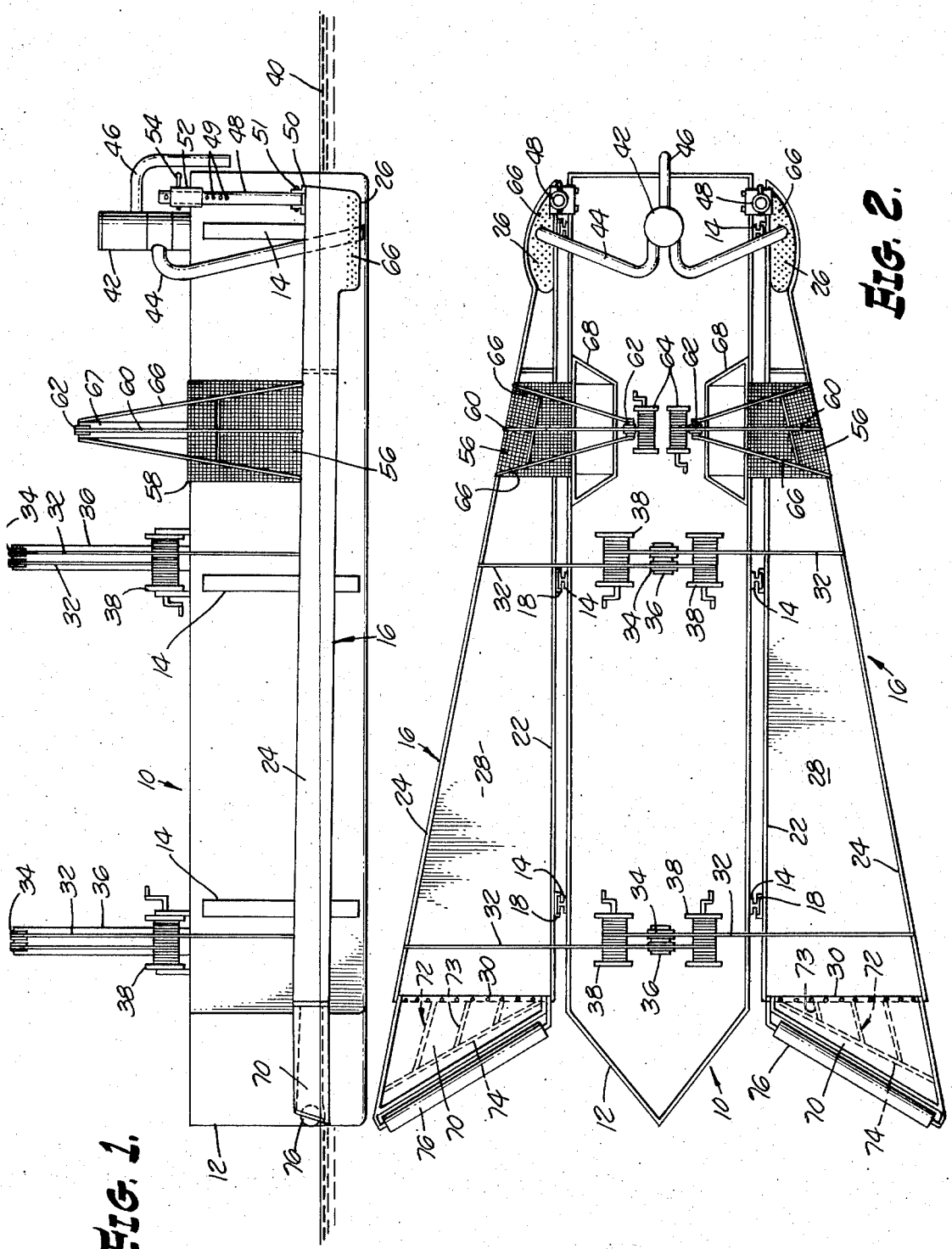

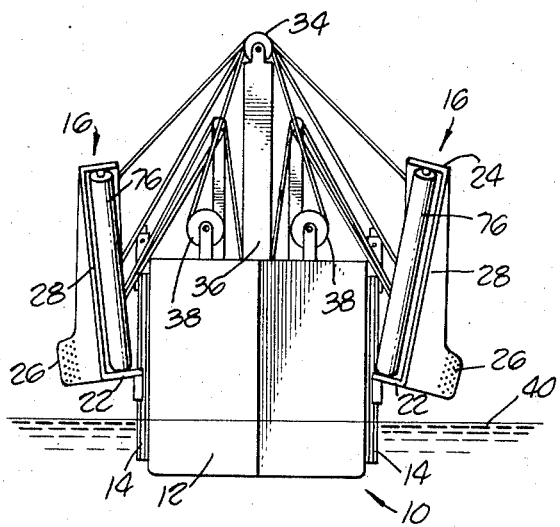
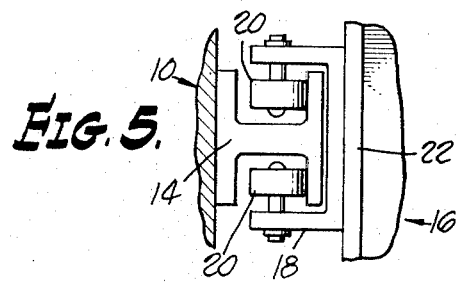
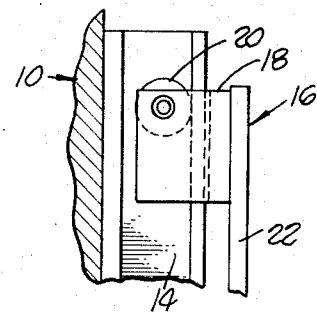
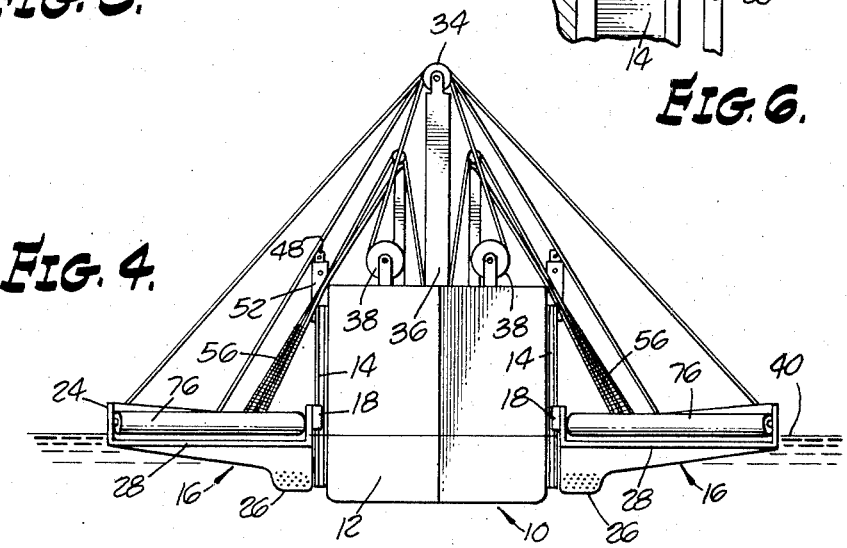
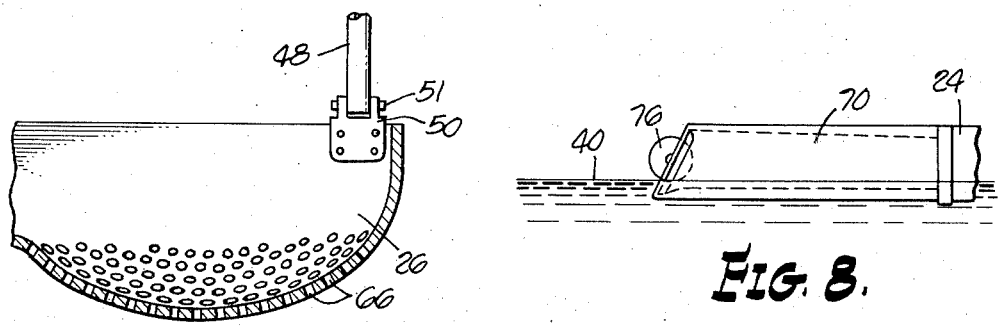

OIL SKIMMER

BACKGROUND OF THE INVENTION

The problem of the pollution of our coastal and inland waters is a serious one, and particularly the pollution caused by the spillage of oil or similar substances such as may occur from the accidental collision of oil tankers, or from accidents occuring around offshore drilling rigs, but also a great deal of pollutants are emitted in harbors and inland waters from the pumping of the bilges of large freighters and tankers, which bilge also includes a mixture of oil and water. While the major oil spills are being cleaned up by the use of straw or peanut shells in order to provide a sufficiently viscous vehicle so that the combination of the oil and straw can be picked up and disposed of, such method does not provide a ready means for rapidly cleaning up an oil spill and particularly provides no means for recovering the oil.

SUMMARY OF THE INVENTION

The present invention adapts a barge with one or more extendable outriggers formed as a sort of flat scoop which converges toward the rear thereof. The outrigger is adapted to be lowered just below the surface of the water so that as the barge is driven through an area in which there is oil floating on the surface, the outriggers will collect the oil converging it toward the rear thereof into a collector sump from which it may be pumped and separated. Separation of the oil and water may be by settling or by using a high-speed oil/water separator, such as that shown in my pending patent application Ser. No. 221,915 filed Jan. 31, 1972. Because some harbors or inland waters also contain a certain amount of floating debris, the invention also includes means for collecting this floating debris and permanently removing it from the water with side benefit of it also preventing clogging the sump area. The invention also provides means for not only tilting the angle of the outriggers but for lowering them up and down so as to maintain their level just below the surface of the oil even though the barge gradually fills with oil and therefore tends to sink lower in the water. The oil skimmer can also be used in situations where there is a light-swell condition by the addition to the outriggers of flexible leading edges supported by a bouyant body which will permit the skimming outriggers to follow the uneven water surface without missing the troughs of the swells or cutting through the tops. When that adapter is applied to the outriggers, it is likely that the debris collecting nets may not be useful since the separation of large floating particles will occur at the front of the outriggers.

It is an object therefore of the present invention to provide a means for cleaning up oils slicks and spills by the provision of a barge having outriggers adapted to skim the oil from the surface and separate it from the water.

Further objects and advantages of the present invention will become readily apparent upon reading the ensuing detailed description.

DESCRIPTION OF THE DRAWINGS

FIG. 1 is a side elevation of a barge equipped with outriggers according to the present invention.

FIG. 2 is a plan view of the barge with the outriggers in their downwardly extended position.

FIG. 3 is a view of the bow of the barge showing the outriggers in their upward position.

FIG. 4 is a view of the bow of the barge with the outriggers in their extended position.

FIG. 5 is a top detail view showing the means of mounting the outriggers to the barge.

FIG. 6 is a side elevation of the detail shown in FIG. 5.

FIG. 7 is a partial sectional elevation showing a modified form for the collector sump.

FIG. 8 is a partial elevation showing a somewhat enlarged detail view of the flexible skimmer and float mechanism.

DESCRIPTION OF THE INVENTION

A barge generally designated 10 and having a pointed bow 12 is provided with a plurality of guide rails 14 upon which are pivotally mounted the outriggers 16. The guide rails 14 are preferably of an I-beam type configuration as shown in FIG. 5 and the mounting means includes a bracket 18 in which are mounted a pair of rollers 20 bearing upon the inside surface of the I-beam so that the outriggers 16 may be pivoted upwardly as shown in FIG. 3 or lowered into a lateral or horizontal position as shown in FIG. 4, the rollers permitting the inside edges of the outriggers to be positioned vertically with respect to the water line as desired.

Each of the outriggers 16 consists of an outboard boom 24 and an inboard boom 22 to which the brackets 18 are secured. Booms 22 and 24 are each elongated, preferably flat members, having their major longitudinal dimension oriented alongside the barge 10, the inboard boom 22 being adapted to run parallel to the side of the barge, while outboard boom 24 is angled inwardly toward the stern of the barge so that the booms converge toward the stern. Near the stern end of the outriggers 16 is provided an enlarged sump area 26. Booms 22 and 24 are joined together by a flat bottom plate 28 and the forward end of the plate 28 is squared off laterally at 30. The outriggers are supported by lines 32 attached to the outboard booms 24 and the lines 32 extend over pulleys 34 mounted upon standoffs 36 upon the barge and then to winches 38. When it is desired to move the barge to an area for cleaning purposes, the outriggers 16 are ordinarily lifted to their upraised position, as shown in FIG. 3, by taking in the lines 32 upon winches 38. In such position, there is minimum drag as the craft moves through the water. When the area to be skimmed is reached, the lines 32 are paid out, lowering the outriggers to the position shown in FIG. 4 for the purpose of skimming. It is desirable to lower the outriggers 16 to a position whereby the bottom plates 28 are just below the surface of the water 40. The barge is then driven under its own power or towed through the water whereby the outriggers will scoop up oil floating on the surface and the bow 12 will deflect other floating oil into the openings of the outriggers and the oil will converge as it moves sternwise in the trough formed by the outriggers and will collect in the sumps 26. A pump 42 is mounted upon the barge with intake pipes 44 extending over the sides and into the bottom of the sumps 26. Pump 42 will pick up primarily oil but also will take some water with it. This will be pumped into a holding tank provided in the barge, where the oil and water can be allowed to separate, whereupon the oil now concentrated, can be pumped off the top. A more efficient system includes a separator coupled to pump 42, of a type which can rapidly separate the oil and water, such as the device described in my pending application, Ser. No. 221,915, previously mentioned. Such device will separate water from the oil and eject it out of the outlet pipe 46 overboard and will pump clean oil into the holding tank in the barge. As the pump runs and fills the barge with oil, or oil plus water, it is obvious that the barge will become heavier in the water and will tend to ride lower in the water.

To accomodate the gradual sinking of the barge as it fills, the guide rails 14 permit the inboard portion of the outriggers 16 to be positioned upwardly or downwardly so that they can be maintained just below the water-oil interface to minimize the amount of water collected. In order to affix the inboard ends of the outriggers, there are a number of systems which may be used to properly orient the outriggers. In one embodiment, a rod 48 is temporarily affixed to a clevis 50 by means of a pin 51 and the upper portion of rod 48 is provided with a plurality of spaced apertures 49. The upper end of rod 48 passes through a bracket 52 having an aperture through which is inserted a pin 54. It will be obvious that the vertical location of the outrigger can be easily adjusted by the insertion of the pin 54 through any one of the apertures 49 and, of course, the orientation of the outriggers can be adjusted to keep the bottom plates horizontal by use of the winches 38 and lines 32 affixed to the outboard booms 24. When it is desired to pull the outriggers into their upwardly raised position, it may be necessary to disassemble the positioning rods 48 whereupon pin 51 may be extracted from the clevis 50 for that purpose.

The use of the outriggers 16 with the squared off ends 30 would be easiest in the skimming of inland waters or harbors where the water surface is relatively smooth. It is anticipated that such waters are frequently laden with floating debris such as papers, bottles and cans which should be prevented from entering the collecting sumps 26. It is also an advantage to remove such floating debris from the waters and for that purpose the outriggers may be provided with collecting nets 56. The inboard ends of the nets 56 are connected at 58 to the gunwale of the barge and the other end is connected to line 60 which extends over a pulley 62 to a winch 64. A pair of guide wires 66 are attached to the outboard railing 24 and to the supporting bar 67 which supports pulley 62. The outer edge of the net 56 is provided at the outer corners with a pair of slip rings (not shown) which pass around the guide wires 66. A container 68 is provided inside the barge as shown in FIG. 2. Thus, when debris is collected in he net 56, the net is pulled upwardly by pulling in line 60 whereupon the corners of the net will gather up as the net slides along the wires 66 thereby lifting up the net until it dumps its contents into container 68.

The sumps 26 can be provided with either a flat bottom as shown in FIG. 1 or a slightly curved bottom as shown in FIG. 7, but in both cases, the bottom is provided with a plurality of apertures 66 preferably in the sternmost portion of sump 26 which will help permit the expulsion of collected water which will naturally tend to flow toward the bottom of the sump.

Another attachment can be provided for the outriggers 16 for using the oil skimmer in somewhat rougher water. This attachment constitutes a flexible member 70 the leading edge of which may converge outwardly as shown in FIG. 2. Member 70 is attached to the ends 30 of the outrigger, to the bottom plate 28 thereof. Beneath the flexible member 70 is mounted a supporting frame or grid 72 having longitudinal fingers 73 and a lateral member 74. These members 73 and 74 are rigidly affixed to bottom plate 28 but do not extend out the entire length of member 70 so that member 70 is still free to flex downwardly at its outer edge. The forwardmost edge of member 70 is attached to a float 76 which extends parallel to the front surface of member 70 but is supported above that surface a short distance, as shown in FIGS. 4 and 8. In this manner, the bouyant member 76 controls the approximate position of the leading edge of flexible member 70 so that it will remain slightly below the surface of the water and will follow the uneven surface of the water as the craft goes through swells and troughs. In this manner, the outrigger will more or less follow the surface of the water as far as its leading edge is concerned and will not take in large quantities of water when the outrigger goes through the crest of a swell, and likewise will not miss oil floating on the surface in the troughs between swells. When the bouyant members 76 is in position, it is obvious that any floating debris or trash will not pass into the trough formed by the outrigger 16 so that the trash net 56 will not be used at such times.

While a specific embodiment of the present invention has been shown and described, together with various alterations and modifications thereof, it will be obvious to those persons skilled in the art that other changes and modifications might be made. Fox example, it is equally contemplated that one outrigger may be utilized in favor of the two shown in the drawings. In such instances, it is contemplated that the forward extent of the outrigger would be greater than shown and the bow of the craft may be slanted entirely to one side, opposed to the outward angle of the edge of the outrigger so that the craft would divert all of the surface oil into the opening of the outrigger.

I claim:

1. An oil skimming apparatus, the combination comprising:

a barge, said barge have an holding tank;

at least one outrigger means movably mounted along a side of said barge, said outrigger means comprising a pair of longitudinal flat booms having their major longitudinal dimension oriented alongside and in substantially the same direction as the sides of said barge, the minor transverse dimension of each said boom being oriented substantially vertically to the surface of the body of water in which said barge is situated, a substantially flat bottom plate joining said booms in spaced apart relationship, said bottom plate having a wide end and a narrow end, the wide end thereof being situated near the bow of said barge whereby said booms converge toward one another near the stern thereof, an enlarged sump portion formed in said bottom plate at the sternmost end thereof between said booms;

mounting means for movably affixing each said outrigger to said barge, said mounting means including means for vertically positioning each said outrigger with respect to said surface, and pivotal means for pivotally lifting said outrigger up and away from said surface, said mounting means further including supporting means coupled to said outrigger means for supporting said outrigger means in an upraised position or in a lowered position whereby said bottom plate may be substantially parallel to said liquid level; and pump means mounted upon said barge, said pump means having an intake conduit positioned in said sump, said pump means having an outlet thereof communicating with said holding tank.

2. The apparatus set forth in claim 1 wherein said mounting means includes a plurality of substantially vertically oriented guide rails affixed to the side of said barge, a plurality of roller means affixed to the inboard side of said outrigger, said roller means each engaging each of said guide rails, positioning means affixed to the inboard sides of said outrigger and to said barge for vertically adjusting the position of the inboard edge of said outrigger with respect to said surface; and said supporting means including a plurality of lines affixed to the outboard edge of each said outrigger, each of said lines being coupled to adjusting means for adjusting the length thereof so as to support said outrigger whereby the bottom plate thereof may be positioned substantially parallel to said surface or whereby said outrigger may be pivotally moved to an upraised position.

3. The apparatus set forth in claim 1 wherein said pump means includes separator means for separating oil from water, said separator having a water outlet directed overboard, the aforesaid pump outlet being an oil outlet communicating with said holding tank.

4. The apparatus set forth in claim 1 said outrigger means further includes a flexible leading edge member fastened to the bottom plate thereof, said leading edge extending forward of said outrigger means, bouyant means secured to the forwardmost edge of said flexible member, said bouyant means being spaced above the forwardmost edge whereby said edge will be positioned beneath the water when said bouyant means is floating thereon.

5. The apparatus set forth in claim 4, further including a rigid frame secured to the leading edge of said outrigger means and extending partially beneath said flexible member whereby downward movement of said flexible member is limited.

6. The apparatus set forth in claim 1 wherein said sump is provided with a plurality of apertures in the bottom thereof.

7. The apparatus set forth in claim 1 further including means mounted upon said barge and secured to said outrigger for collecting floating debris, said means comprising a container situated on said barge, a net having one end secured to the outboard edge of said container, the other end of said net being removably secured to the outboard rail of said outrigger, said net being of sufficient length to be draped along the bottom of said outrigger, and means secured to the outboard end of said net for gathering in said net to dump the contents thereof into said container.

* * * * *